(12) United States Patent
Torman et al.

(10) Patent No.: US 10,984,665 B2
(45) Date of Patent: Apr. 20, 2021

(54) CUSTOMIZING SEQUENCES OF CONTENT OBJECTS

(71) Applicant: salesforce.com, inc., San Francisco, CA (US)

(72) Inventors: Adam Torman, Walnut Creek, CA (US); Douglas Bitting, Pleasanton, CA (US); Chris Fox, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 233 days.

(21) Appl. No.: 15/479,729

(22) Filed: Apr. 5, 2017

(65) Prior Publication Data
US 2018/0096613 A1 Apr. 5, 2018

Related U.S. Application Data

(60) Provisional application No. 62/402,775, filed on Sep. 30, 2016.

(51) Int. Cl.
G09B 5/00 (2006.01)
G09B 5/02 (2006.01)
G06F 3/14 (2006.01)
G09B 7/02 (2006.01)
H04L 29/08 (2006.01)
G06F 3/0482 (2013.01)

(52) U.S. Cl.
CPC ............. *G09B 5/02* (2013.01); *G06F 3/1454* (2013.01); *G09B 7/02* (2013.01); *H04L 67/306* (2013.01); *G06F 3/0482* (2013.01); *G09G 2354/00* (2013.01)

(58) Field of Classification Search
CPC ... G09B 5/00; G09B 5/02; G09B 5/08; G09B 5/12; G06F 3/0482
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

U.S. Appl. No. 15/218,468, filed Jul. 25, 2016, U.S. Appl. No. 15/218,468.

(Continued)

*Primary Examiner* — Peter R Egloff
(74) *Attorney, Agent, or Firm* — Weaver Austin Villeneuve & Sampson LLP

(57) ABSTRACT

Disclosed are examples of systems, apparatus, methods, and computer program products customizing sequences of content objects in an educational content management system. In some implementations, educational content objects can be displayed. A first educational content object selection can be processed. A content object sequence can be generated or updated and the first educational content object can be added to the content object sequence. A second educational content object can be added to the content object sequence. The content object sequence can be shared with a user of an enterprise learning system.

25 Claims, 9 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshaysky et al. |
| 9,628,493 B2 | 4/2017 | Warshaysky et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0286536 A1* | 12/2006 | Mohler ............ G09B 5/00 434/350 |
| 2008/0108025 A1* | 5/2008 | Menell ............ G09B 5/00 434/118 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0151431 A1* | 6/2010 | Miller ............ G09B 5/00 434/350 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0288843 A1* | 11/2012 | Shaffer ............ G09B 7/02 434/350 |
| 2012/0290407 A1 | 11/2012 | Hubbard et al. |
| 2013/0109002 A1* | 5/2013 | Howard ............ G09B 5/00 434/350 |
| 2013/0171594 A1* | 7/2013 | Gorman ............ G09B 5/00 434/219 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006441 A1 | 1/2014 | Torman et al. |
| 2014/0272889 A1* | 9/2014 | Kulkarni ............ G09B 5/08 434/350 |
| 2014/0322694 A1* | 10/2014 | Kolla ............ G09B 5/08 434/362 |
| 2014/0344435 A1 | 11/2014 | Mortimore, Jr. et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0127670 A1 | 5/2015 | Torman et al. |
| 2015/0142596 A1 | 5/2015 | Jakobson et al. |
| 2015/0170529 A1* | 6/2015 | Hafeez ............ G09B 5/00 434/350 |
| 2015/0172563 A1 | 6/2015 | Jakobson et al. |
| 2016/0041976 A1 | 2/2016 | Pradeep et al. |
| 2016/0063878 A1* | 3/2016 | Subashchandrabose ............ G09B 5/12 434/322 |
| 2016/0105409 A1 | 4/2016 | Torman et al. |
| 2016/0217113 A1* | 7/2016 | Bartle ............ G09B 5/00 |
| 2017/0075922 A1 | 3/2017 | Torman et al. |
| 2017/0076012 A1 | 3/2017 | Sreenivasa et al. |
| 2018/0025113 A1 | 1/2018 | Torman et al. |
| 2018/0095790 A1 | 4/2018 | Pradeep et al. |
| 2018/0096012 A1 | 4/2018 | Warshavsky et al. |
| 2018/0096013 A1 | 4/2018 | Warshavsky et al. |
| 2018/0096020 A1 | 4/2018 | Sreenivasa et al. |
| 2018/0096024 A1 | 4/2018 | Bitting et al. |
| 2018/0096165 A1 | 4/2018 | Warshavsky et al. |

OTHER PUBLICATIONS

U.S. Appl. No. 15/283,130, filed Sep. 30, 2016, U.S. Appl. No. 15/283,130.

U.S. Appl. No. 15/283,145, filed Sep. 30, 2016, U.S. Appl. No. 15/283,145.

U.S. Appl. No. 15/283,119, filed Sep. 30, 2016, U.S. Appl. No. 15/283,119.

U.S. Appl. No. 15/281,559, filed Sep. 30, 2016, U.S. Appl. No. 15/281,559.

U.S. Appl. No. 15/455,433, filed Mar. 10, 2017, U.S. Appl. No. 15/455,433.

U.S. Appl. No. 15/455,452, filed Mar. 10, 2017, U.S. Appl. No. 15/455,452.

"Google Plus Users", Google+Ripples, Oct. 31, 2011 [retrieved on Feb. 21, 2012 from Internet at http://www.googleplusers.com/google-ripples.html[, 3 pages.

* cited by examiner

| | | | |
|---|---|---|---|
| 602 → | Visible to: | | 600 |
| | ⦿ Specific People  ○ Private | | |
| 604 → | Shareable link: | | |
| | http://th.sfdc.com/sequences/sequence1 | | |
| 606 → | Assign to: | | |
| | Name or email address... | | |
| 608 → | Who has access: | | Due Date |
| | Adam | 610a | 12/25/17 |
| | Chris | 610b | 12/31/17 |
| | Doug | 610c | Set Date |

CUSTOMIZING SEQUENCES OF CONTENT OBJECTS

PRIORITY DATA

This patent document claims priority to commonly assigned U.S. Provisional Patent Application No. 62/402,775, titled "CUSTOMIZING CONTENT SEQUENCES IN A WEB PUBLISHING PROCESS," by Torman et al., filed on Sep. 30, 2016, which is hereby incorporated by reference in its entirety and for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to content objects of a content management system. More specifically, this patent document discloses techniques for customizing sequences of content objects in an educational content management system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 6 shows an example of sharing a content object sequence, in accordance with some implementations.

DETAILED DESCRIPTION

Figure 1:
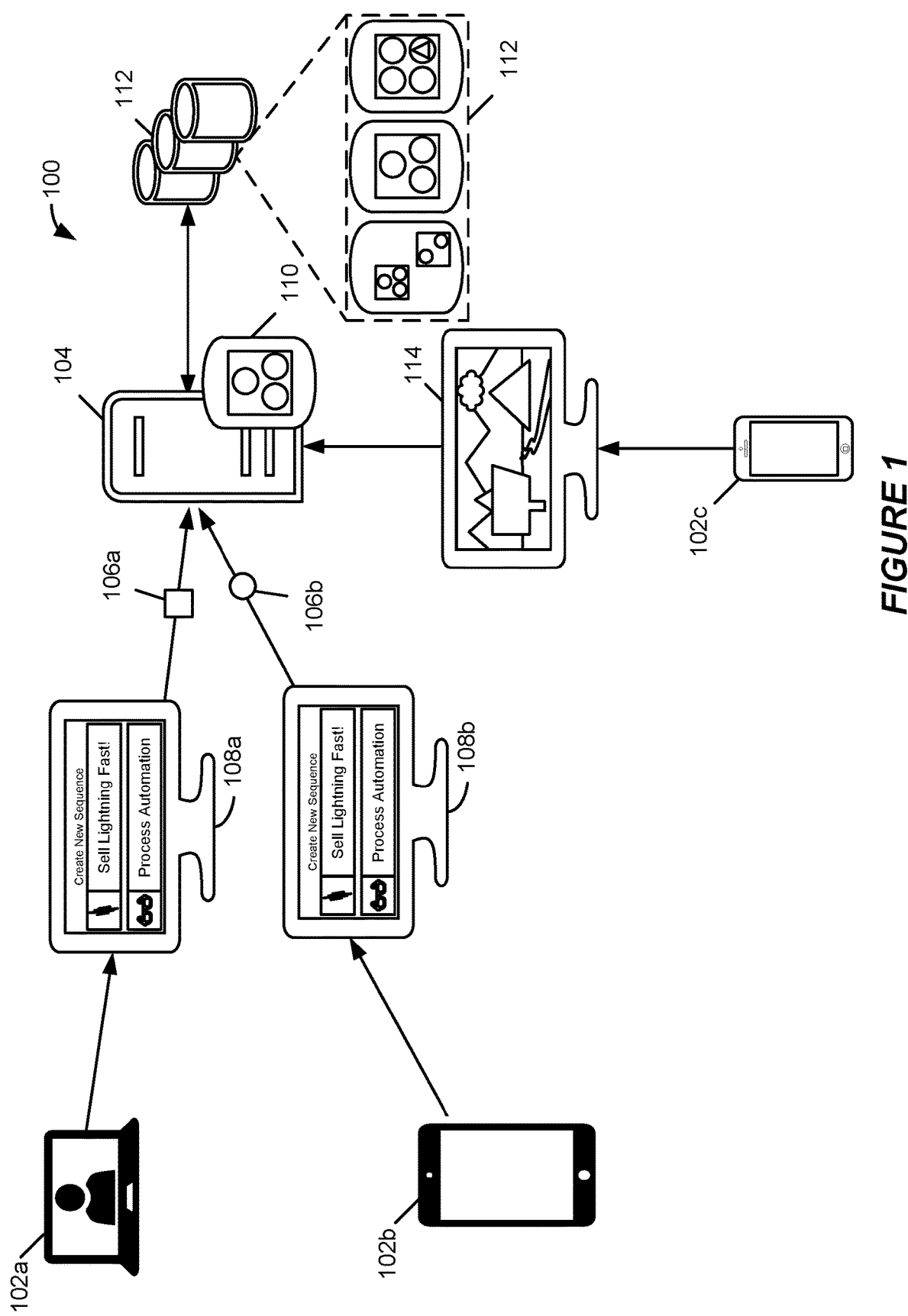
FIG. 1 shows a system diagram of an example of a system 100 for customizing sequences of content objects in an educational content management system, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some of the disclosed implementations of systems, apparatus, methods and computer program products are for customizing sequences of content objects in an educational content management system.

In a conventional learning environment, there are standard sequences of educational content that are curated by a department and/or organization of the learning environment. One example of a standard sequence is on the basics of CRM. In one example, as part of onboarding new employees, a manager assigns sequences of educational content to the new employees, e.g., a guided learning path titled "CRM Beginner." Unfortunately, some of the standard sequences include portions of educational content that are considered by the manager to be irrelevant for the onboarding experience. For example, the manager knows that the "CRM Beginner" sequence includes content that is too basic for the employees being on boarded, and he also knows that some of educational content from the "CRM Intermediate" sequence would be appropriate. As such, the manager may either assign the two sequences or only the CRM Beginner, which can result inefficient allocation of employee time as part of their onboarding experience.

Some of the disclosed techniques can be used for customizing sequences of content objects in an educational content management system. In some of the disclosed techniques, a user customizes sequences of content objects, e.g., module objects, project objects, etc., by choosing to include or exclude content objects according to the user's preference. For example, the manager from the example above can customize their own version of a "CRM Beginner" sequence by removing some modules that the manager believes are not relevant and adding some useful modules from the "CRM Intermediate" sequence. As such, the manager can assign his customized sequence to new employees as part of their on-boarding experience in a manner he believes to be the most beneficial, allowing for more effective allocation of employee time during their onboarding experience.

In another particularly useful implementation of some of the disclosed techniques, a motivated user interested in advancing their career can customize sequences of content objects which represent a trackable career plan for the user. In this example, the user has as much authority as a training department or as their manager in determining their career path and achievements. As a result, custom sequences of content objects can be used by individuals to self-advocate for their advancement and learning opportunities.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

In some but not all implementations, the disclosed methods, apparatus, systems, and computer-readable storage media may be configured or designed for use in a multi-tenant database environment. The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

FIG. 1 shows a system diagram of an example of a system 100 for customizing sequences of content objects in an educational content management system, in accordance with some implementations. System 100 includes a variety of different hardware and/or software components that are in communication with each other. In the non-limiting example of FIG. 1, system 100 includes user devices 102a-102c, server 104, at least one content object sequence 110, and database 112.

User devices 102a-102c can be operated by a variety of users with different roles and/or permissions. In the example of FIG. 1, user device 102a is a laptop computer, user device 102b is a tablet, and user device 102c is a smartphone. Examples of users operating user devices 102a-102c may include business users, technical users, content generating users, learning users, etc. It should be noted be noted that the list of users is not limited to the above-mentioned examples. Other types of users are envisioned and may be adjusted and/or added depending on customer need. In some implementations, user device 102a provides selections of educational content objects, e.g., educational content object 106a to server 104. Examples of educational content objects may include path objects, module objects, unit objects, project objects, quiz objects, badge objects, first call deck objects, super badge objects, custom objects, external objects, stand-and-deliver badges, 1:1 meetings, or reviewing content objects, etc. It should be noted be noted that the list of educational content objects is not limited to the above-mentioned examples. Other types of educational content objects are envisioned and may be adjusted and/or added depending on customer need. Also or alternatively, user device 102b can provide educational content object 106b to server 104. Users of user devices 102a and 102b may select different educational content objects to customize content object sequences, allowing for additional possibilities for a user to discover educational content, as well as how educational content is accessed by the user. In some implementations, a user may add publicly available content objects and using a sharing and/or permission mechanism, e.g. types/roles of users.

Examples of user devices 102a-102c include, but are not limited to a desktop computer or portable electronic device such as a smartphone, a tablet, a laptop, a wearable device such as Google Glass®, another optical head-mounted display (OHMD) device, a smart watch, etc. Each of user devices 102a-102c can display different types of user interfaces, for instance, user interface 108a, user interface 108b, and user interface 114. User interfaces 108a, 108b, and 114 can be displayed for different purposes. For example, user interfaces 108a and 108b can provide functionality to user devices 102a and 102b such that users may access, update, or otherwise modify content object sequences. Whereas user interface 114 can provide functionality to user devices 102c such that users may being the learning process of a customized guided learning experience using a content object sequence created at user interface 108a.

Server 104 may control communication with other components of system 100. This communication may be facilitated through a combination of networks and interfaces. Server 104 may handle and process data requests from user devices 102a-102c of system 100. In some implementations, generating content object sequences can be facilitated through one or more application programming interfaces (APIs) restricted to an appropriate set of users, allowing for extensibility in assigning and/or tracking content object sequences based on the needs of a particular organization. Similarly, the ability to select or view content object sequences can be restricted by API access. For example, a user with permission to create content object sequences would have access to APIs configured to access content stored in database 112. In some implementations, creating and maintaining content object sequences can be facilitated through an API and a third party management system, e.g., a learning management system not controlled by system 100. Content object sequences can be generated using API requests. In one example, interaction with content object sequences is facilitated through public and/or private APIs to add, update, or otherwise modify content object sequences. For example, adding a module object to a new content object sequence. In some implementations, a series of API requests can be executed to organize and arrange the sequential order of content object sequence 110. A variety of different API requests can be used to handle content object sequences. For example, a create content object sequence request, a delete content object sequence request, an update content object sequence request, an execute search of content object sequence request, a get content object sequence request, a version content object sequence request, or a custom API request. In one example, API requests configured to adjust the sequential order of many module objects can be executed by server 104. Similarly, API requests configured to update and/or generate content object sequences, as well as, share content object sequences can be executed by server 104. In some implementations, the processing of a series of API requests is asynchronous, which can allow for an uninterrupted customer experience as changes are being made to content object sequences. In other implementations, server 104 provides user interfaces 108a, 108b, and 114 to user devices 102a-102c respectively.

Database 112 can be configured to receive, transmit, store, update, and otherwise maintain educational content objects and content object sequences. In some implementations, database 112 is configured on a per user basis, allowing any one of hundreds of thousands of users to create, edit, or delete content object sequences associated with their account. In some implementations, the order of content object sequences can be customized. In some implementations, users can publish and share content object sequences with a public audience. Also or alternatively, content object sequences can be published securely to groups of members or subscribers of a particular content object sequence. There can be various ways to discover content object sequences. For example, approved content object sequences can be sent to a user as a notification, e.g., push notification, users can search approved content object lists, and recommendations can be generated and provided to users. In some implementations, searching for content object sequences can be implemented according to taxonomy, or a categorization model, that makes it easy to discover content object sequences within the context of other areas of an enterprise learning system, e.g., viewing an existing content object sequence at a profile of a user. Consequently, discoverability of content object sequences can reduce user frustration and allow a user to find relevant content object sequence. In some implementations, database 112 can also store customer relationship management (CRM) records. Examples of CRM records include instances of accounts, opportunities, leads, cases, contacts, contracts, campaigns, solutions, quotes, purchase orders, etc.

Figure 2:
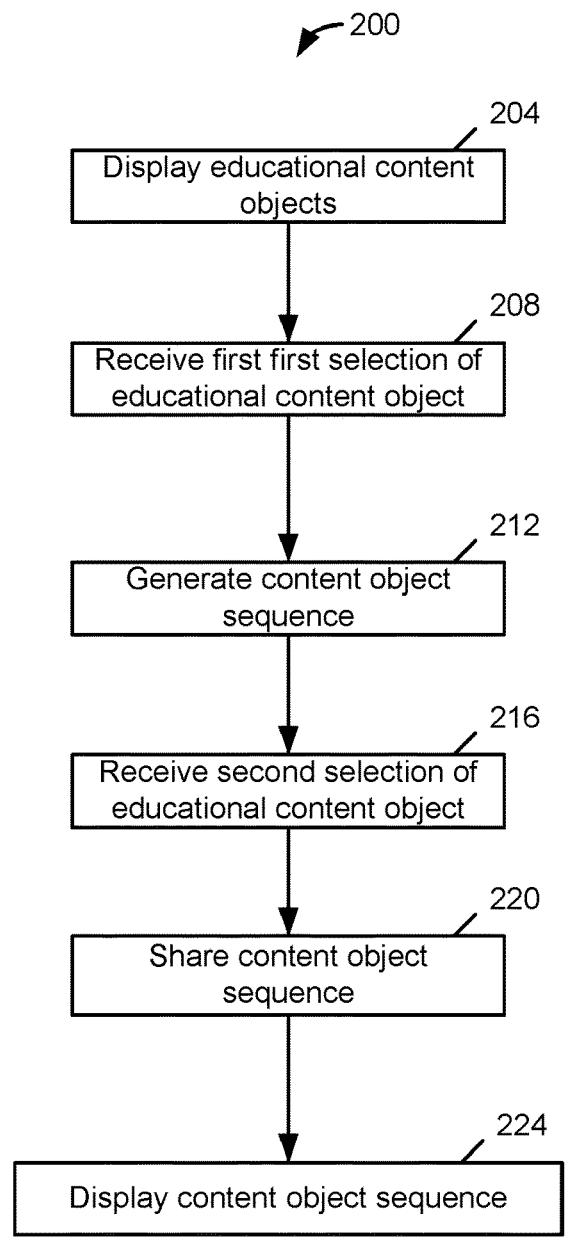
FIG. 2 shows a flow chart of an example of a method 200 for customizing sequences of content objects in an educational content management system, in accordance with some implementations.

FIG. 2 shows a flow chart of an example of a method 200 for customizing sequences of content objects in an educational content management system, in accordance with some implementations.

In block 204 of FIG. 2, educational content objects are displayed in user interface 108a of FIG. 1 of user device 102a. In some implementations, educational content objects are displayed in response to a user of user device 102a logging into their enterprise learning system account. In other implementations, educational content objects are displayed in response to the user of user device 102a navigating to another user's profile. In still other implementations, educational content objects can be displayed when a user navigates to a tab corresponding to a type of content object, e.g., module object tab, path object tab, etc. Educational content objects can have different types of content, e.g., text and pictures for a learning topic, and metadata, e.g., roles associated with the educational content object, difficultly level associated with the content object, etc. In some implementations, a variety of educational content objects can be displayed, e.g., unit objects, module objects, path objects (or trails), or other educational content objects. In some implementations, a module object can be a series of sequential unit objects associated with a particular topic or subject area. Once all the unit objects in a module object are complete, a user may receive a badge representing a badge object that will be displayed on a user's profile webpage on the enterprise learning system. In addition, a user's profile can display content object sequences created by that user with information about each sequence. For example, a user's profile might include a "My Content Object Sequences" section with many content object sequences displayed in the section, as well information about the content object sequences, e.g., the number of views, the number of completions, the number of attempts, the date created, etc. In some implementations, a unit object takes you through several learning objectives for features, tools, or best practices related to a topic, e.g., database system administration. Unit objects can conclude with an assessment, e.g., a challenge, or quiz object, that reinforces a learning objective. A challenge can be an interactive hands-on challenge within a learning environment that simulates or represents a system or tool within the organization that the user would otherwise use to perform their job like a word processor or order entry application. If a user completes a challenge, the user can earn points that are added to a user's profile. Similar to module objects being a collection of unit objects, path objects can be a collection of module objects. In some implementations, path objects are the highest content object in a content object hierarchy that is organized as a guided learning path, discussed further below. In other implementations, a list of several path objects on different topics can be displayed. In other implementations, a single educational content object can be displayed. For example, user 1 may visit the profile of user 2, and within the webpage for the profile of user 2, there may be a section for path objects recently completed by that user. In this example, user 2 may have recently completed only one path object, e.g., "CRM Basics."

Figure 3A:
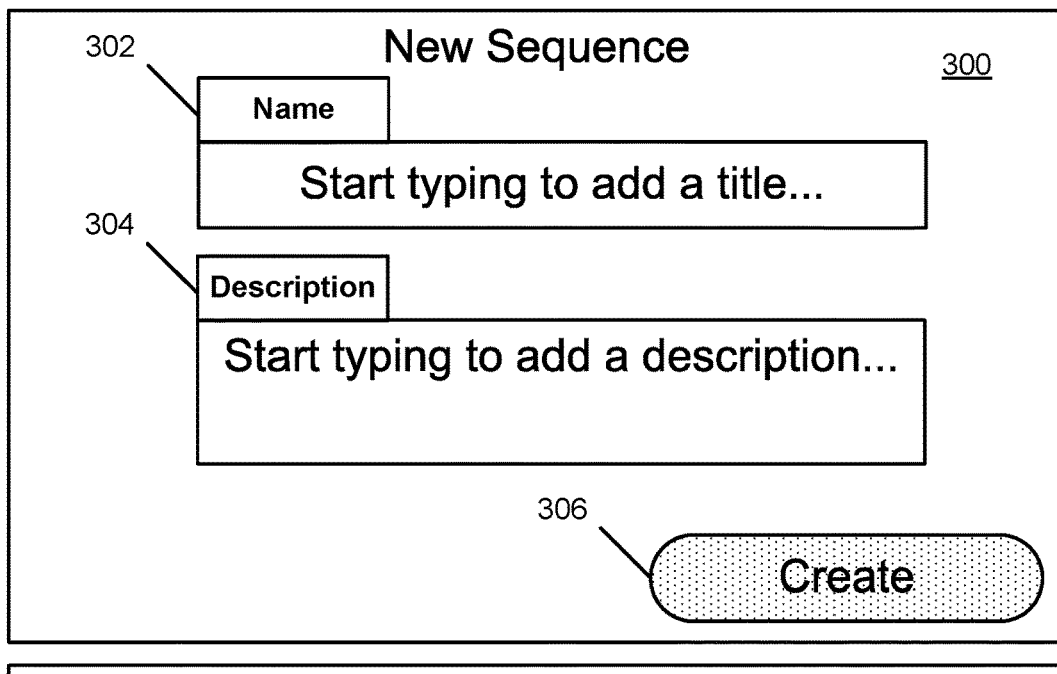
FIGS. 3A and 3B show examples of generating content object sequences, in accordance with some implementations.
Figure 3A:
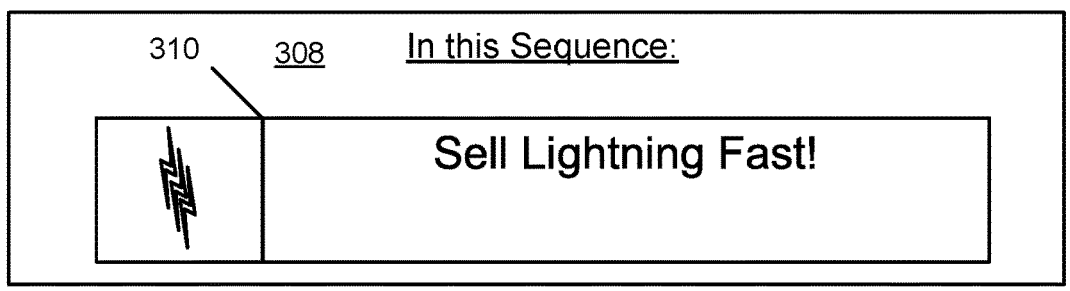
Figure 3B:
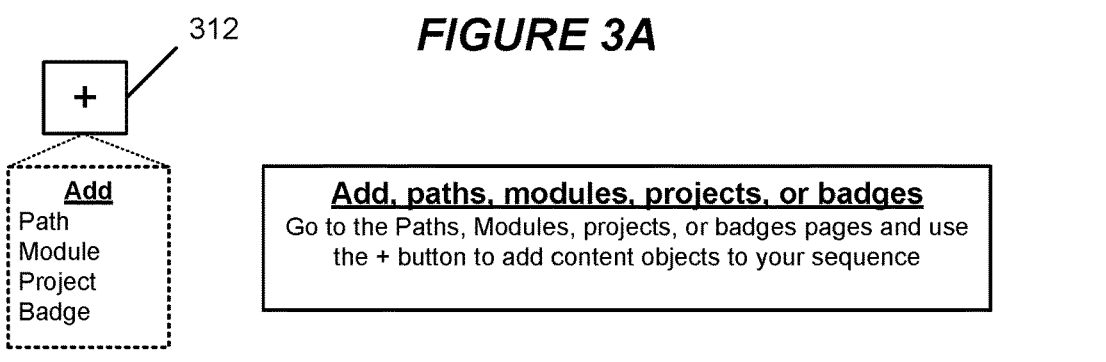
Figure 3B:
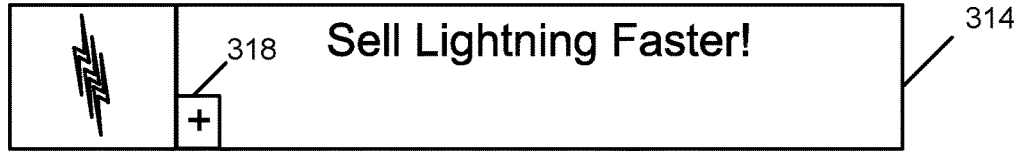
Figure 3B:
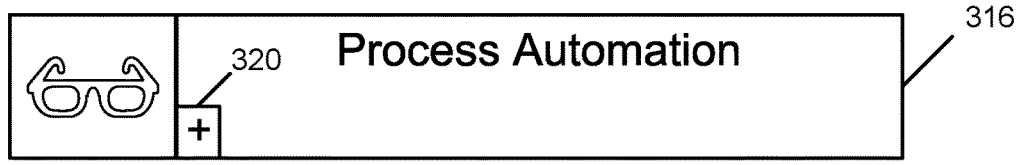

In block 208 of FIG. 2, educational content object 106*a* of FIG. 1 is received from user device 102*a*. For example, FIGS. 3A and 3B show examples of generating content object sequences, in accordance with some implementations. In some implementations, a user selects a button associated with display of pane 300 for inputting information about a new content object sequence. In FIG. 3A, a user may select name field 302 to add a name to the content object sequence. Similarly, after inputting a name associated with the content object sequence, the user may select description field 304 to add a brief description to the content object sequence. The name and description associated with the content object sequence can be useful for allowing search and discoverability of the new content object sequence. After inputting the description in description field 304, the user may select button 306 to send a request and/or selection to server 104 of FIG. 1. Also or alternatively, after selecting button 306 of FIG. 3, the selection may also be used by server 104 of FIG. 1 to generate and/or update a content object sequence, discussed further below. For example, if the selected content object is the first content object to be added to the content object sequence, then a content object sequence can be created to start the process of customizing and adding educational content objects to a new content object sequence. After processing the selection, content object sequence 308 can be displayed as including educational content object 310, e.g., a module titled "Selling Lightning Fast!" FIG. 3B show another example of how a first selection of an educational content object can be provided to server 104 of FIG. 1. For example, a user can select button 312 of FIG. 3, causing a drop down pane to appear with additional selection options. These selection options can include different types of content objects, for instance, adding a path object, adding a module object, adding a project object, or adding a badge object. A user may select one of these options to create a new content object sequence based on the type of selected content object. For example, if a user selects add module object, then a selection of the module object can be provided to server 104 of FIG. 1. Returning to FIG. 3, module object 314 includes button 318, which can be selected by a user to provide a module object titled "Sell Lightning Faster!" to server 104 of FIG. 1. Similarly, module object 316 of FIG. 3 includes button 320, which can also be selected by the user to provide a module object titled "Process Automation" to server 104 of FIG. 1.

Figure 4:
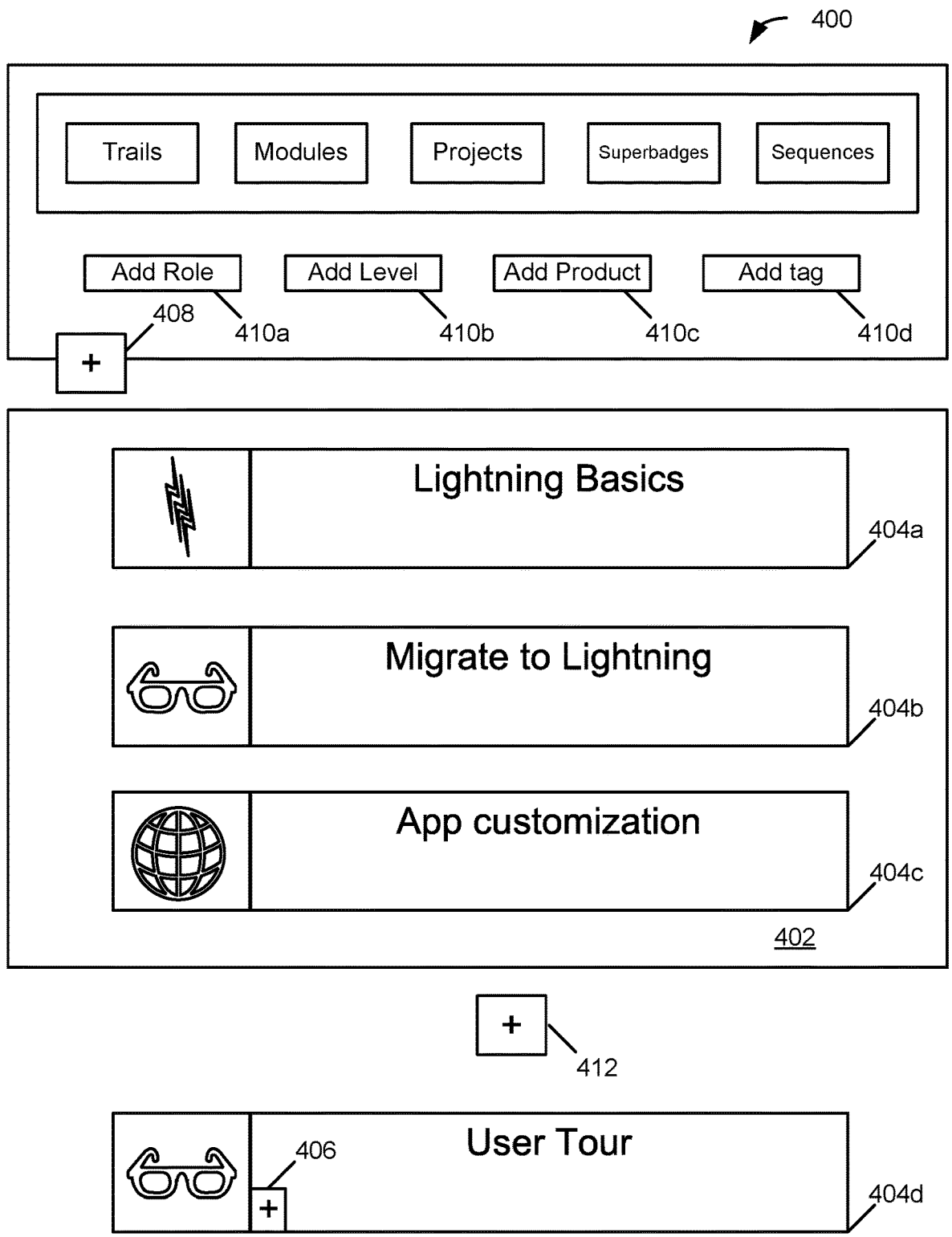
FIG. 4 shows an example of user interface 400 in the form of a graphical user interface (GUI) as displayed on a computing device for generating content object sequences, in accordance with some implementations.

In block 212 of FIG. 2, content object sequence 110 of FIG. 1 is generated by server 104. In some implementations, content object sequence 110 is generated in response to receiving educational content object 106*a* from user device 102*a*. Content object sequence 110 can be stored and otherwise maintained at database 112 among many other content object sequences. Also or alternatively, a previously generated content object sequence can be updated in response to receiving educational content object 106*a*. The previously generated content object sequence can be accessed using database 112. For example, FIG. 4 shows an example of user interface 400 in the form of a GUI as displayed on a computing device for generating content object sequences, in accordance with some implementations. In FIG. 4, content object sequence 402 includes educational content objects 404*a*-404*c*, which may include a corresponding link for each respective educational content object. Content object sequence 402 can include a sequential order of the educational content objects that can be customized by a user. The sequential order can be stored as alphanumeric positions associated with content object sequence. In the example of FIG. 4, educational content objects 404*a*-404*c* are arranged in a sequential order such that educational content object 404*a* has a first position, educational content object 404*b* has a second position, and educational content object 404*c* has a third position. As such, when a user accesses content object sequence 402, the user may first be presented with content from educational content object 404*a*. Upon completing educational content object 404*a*, the next educational content object presented to the user would be educational content object 404*b*. In some implementations, content object sequence 402 can be provided to user device 102*a* of FIG. 1 and displayed in user interface 400 of FIG. 4 as a representation of a preview presentation of content object sequence 402. As such, a user may view the content object sequence 402 and educational content objects 404*a*-404*c* as they would appear to an end user, e.g., at user device 102*c* of FIG. 1. In some implementations, content object sequences can be configured to prevent a user from attempting to complete a more advanced step in the process, e.g., educational content object 404*b*, prior to completing an earlier step in the sequence, e.g., educational content object 404*a*. In some implementations, many preview presentations can be sent to other users, for instance, user device 102*b*.

Figure 5:
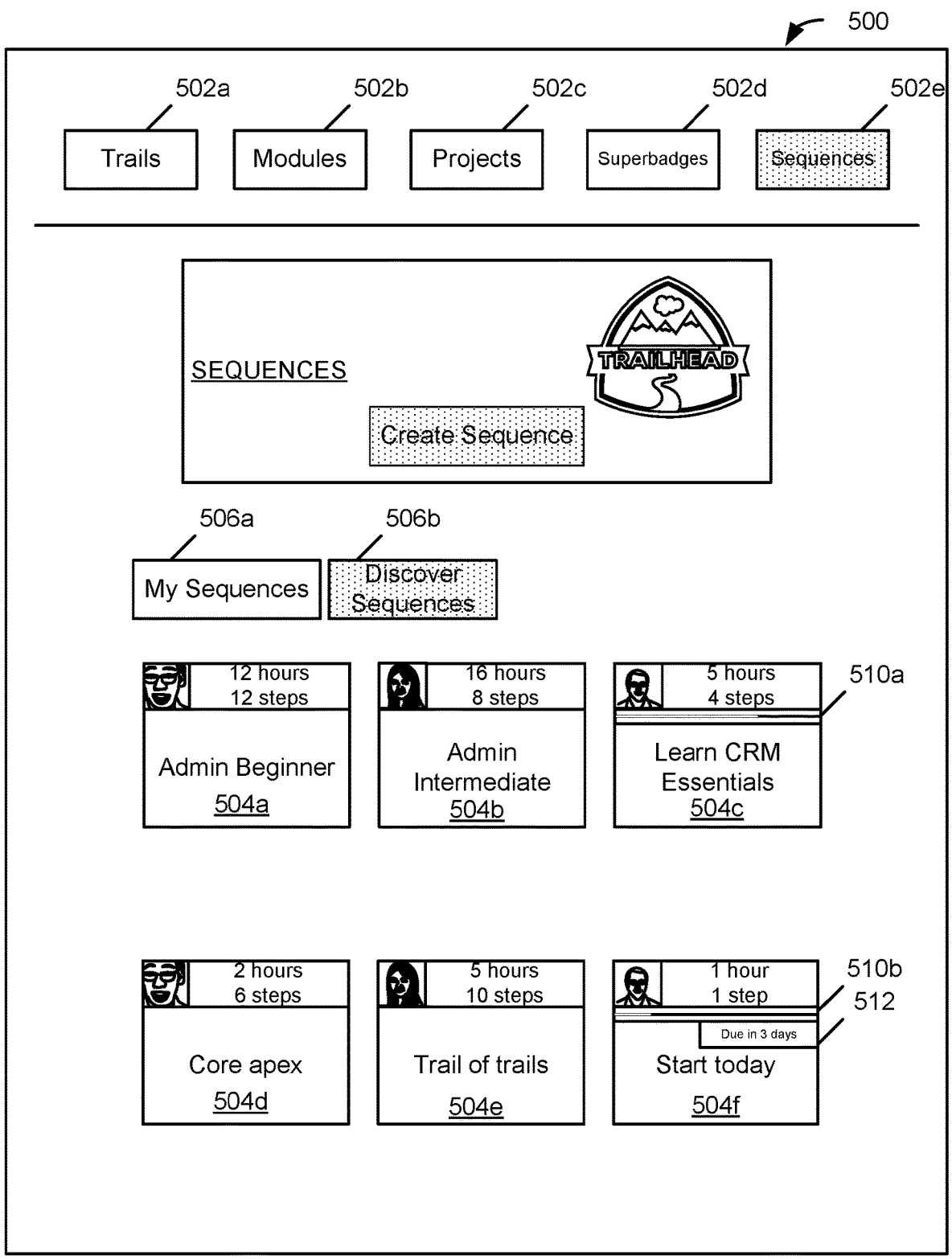
FIG. 5 shows an example of user interface 500 in the form of a GUI as displayed on a computing device displaying content object sequences, in accordance with some implementations.

In another example, FIG. 5 shows an example of user interface 500 in the form of a GUI as displayed on a computing device displaying content object sequences, in accordance with some implementations. In FIG. 5, user interface 500 includes content object sequences 504*a*-504*f*. In some implementations, a user may be presented this view in user interface 500 upon selection of tab 506*b*, e.g., "Discover Sequences" tab. In FIG. 5, content object sequence 504*c* and content object sequence 504*f* include progress bars 510*a* and 510*b* that can be displayed to users so that they are aware of whether they have begun a particular content object sequence and how far along they are in a particular content object sequence. In addition, a due date indication can be displayed as part of a content object sequence. For example, content object sequence 504 includes progress bar 510*b* and due date indication 512. As such a user viewing user interface 500 can become aware that a content object sequence has a due date with an upcoming deadline. For example, content object sequence 504*f* is due in 3 days. In other implementations, if a user were to select content object sequence 504*f*, a user interface displaying the educational content objects can also include a similar progress bar, as well as a due date indication indicating that content object sequence 504*f* is due in 3 days. Similarly, a user's profile can display progress bars for the content object sequences he or she is working on. Due date indication 512 can be displayed as a different color than educational content object 504 to indicate the relative immediacy of the upcoming deadline, e.g., yellow for an approaching deadline, red for past due, etc. In other implementations, the user may select tab 506*a* to be presented with any content object sequences that the user has created. In some cases, after creating a content object sequence, e.g., content object sequence 402 of FIG. 4, content object sequence 402 might be displayed alongside any other content object sequences displayed as part of a "My sequences" webpage.

In block 216 of FIG. 2, educational content object 106*b* of FIG. 1 is received at server 104. In some implementations, block 216 of FIG. 2 can be performed in a similar manner to block 208. In some implementations, educational content object 106*a* is received from user device 102*b*, but in other implementations, educational content object 106*b* can be received from user device 102*a*. Returning to FIGS. 3A and 3B, after educational content object 310 has been added to content object sequence 308, further educational content objects can be added to content object sequence 308 by selecting buttons 318 and 320. Also or alternatively, additional content objects can be added to content object sequence 308 after receiving a selection associated with button 312. In another example using FIG. 4, an additional educational content object can be added using button 406 of educational content object 404*d* to provide an additional selection to server 104 of FIG. 1. Additionally, a user may select button 408 of FIG. 4 to provide an additional selection of an educational content object to server 104 of FIG. 1. As discussed further above, upon receiving additional educational content objects, server 104 may assign positions to educational content objects in the content object sequence. In some implementations, server 104 can process modifications to content objects such that the modification changes or updates the sequential order of the educational content objects in the content object sequence. For example, a user may select content object 404*a* and drag it below content object 404*b*, causing the sequential order of content object sequence 402 to be updated. In another example, a user may select a button located near educational content object 404*a* and adjust a numeric value, e.g., from 1 to 2. Other modifications to content object sequence 402 can include adding and/or updating metadata 410*a*-410*d* associated with content object sequence 402. Metadata 410*a* may be a drop down menu for adding metadata about roles associated with content object sequence 402, e.g., employee, manager, business user, administrator, etc. Metadata 410*b* may be a drop down menu for adding metadata about a skill level associated with content object sequence 402, e.g., beginner, intermediate, or advanced. Metadata 410*c* may be a drop down menu for adding metadata about products associated with content object sequence 402, e.g., Trailhead, Lightning, etc. Metadata 410*d* may be a drop down menu for adding metadata concerning tags associated with content object sequence 402, e.g., frameworks, tutorials, customization, etc.

In some implementations, a modification to content object sequence 402 can include selecting recommendation button 412. Upon selecting recommendation button 412, user interface 400 can display a recommended educational content object, for instance, educational content object 404*d*. The recommendation button can be used to suggest additional educational content objects that are related to a content object sequence that a user is currently working on. The manner in which recommended content objects are displayed may vary according to different implementations of a recommendation engine that may use a combination of traditional search algorithms, machine learning techniques or programmatic algorithms. For example, a recommended educational content object can be provided based on the title of the content object sequence, for instance, a content object sequenced titled "Introduction to Lightning" might receive recommended educational content objects such as "Lightning Basics" and "Migrate to Lightning." In another example, a recommended educational content object can be displayed in near real-time based on comparing groups of users and the their content interaction behavior. For example, a manager is recommended educational content objects based on what other managers are assigning the employees they are supervising. Criteria for assessing similar groups include job title, department, interests based on associated records, etc. Criteria for interaction behavior include whether similar content object sequences were viewed, started, or completed, etc. After user interface 400 displays educational content object 404*d*, a user may select button 406 to add the educational content object 404*d* to content object sequence 402. Also or alternatively, if the user decides that the educational content object 404*d* is not relevant to content object sequence 402, the user may instead decide to generate another recommendation by selecting recommendation button 412 again.

In block 216 of FIG. 2, content object sequence 110 of FIG. 1 is shared with another user of enterprise learning system 100, for instance, content object sequence 110 can be shared with a user of user device 102*c*. Permissions can be identified for users and levels of access can be determined based on the identified permission. In one example, a determination includes a notification of that the content object sequence has been created and is stored in database, which can allow any public user to access the content object sequence. As another illustration, FIG. 6 shows an example of sharing a content object sequence, in accordance with some implementations. After selecting a share button, pane 600 can be displayed on a user device. Pane 600 can include a visibility type 602, a shareable link 604, assignment field 606, distribution list 608, and user information 610*a*. User information 610*a* can include the name of the user that will have access to the content object sequence, as well as, a due date to assign that user for when he or she should have completed the content object sequence.

Also or alternatively, access to content object sequences can be based on levels of access allowing creation and publication of content object sequences. In some implementations, custom sequences of educational content objects may be restricted at a customer level, discussed further below regarding multitenancy. For example, restricting access on a per organization basis can be important to protect sensitive information, e.g., Company A does not want Company B to view their proprietary sales methodology. In other implementations, there may be more granular restrictions, e.g., at a group level. For example, different groups creating content object sequences can restrict access to within that group and control when the content object sequence can be reused or accessed by other groups of employees. For example, group a may wish to restrict access to a content object sequence until the final version of the sequence is ready for distribution to other groups. In some implementations, public users of enterprise learning system can add their content object sequences to education learning system, but may not be able to restrict access to publicly available content objects, e.g., a content object created by an employee of the enterprise learning system.

In some implementations, a user that creates a custom content object sequence might automatically be designated as an owner of a content object sequence with ownership rights to distribute and modify the content object sequence. Other permission levels might include: consumers who can view content object sequences; contributors who can view, edit, but not publish content object sequences; or editors who can view, author, publish, and delete content object sequences. For example, contributors and editors might choose whether and how content object sequences are shared for use with additional content object sequences, whereas owners and editors might be able to designate who can be added as users of a private content object sequence. In some implementations, content object sequences can be curated, for instance, content object sequences created by public users may have their content object sequences sent to employees of enterprise learning system for approval before being published to the enterprise learning system. In other implementations, security might be restricted through link sharing. In other words, users with the link (provided by email or another manner of notification) may be the only users who can access a content object sequence, and it would be inaccessible through a search of the education learning platform.

In block 220 of FIG. 2, content object sequence 110 of FIG. 1 is displayed on user interface 114 of user device 102c. In some implementations, content object sequences 504a-504f of FIG. 5 can be displayed after a user selects tab 502e from tabs 502a-502e. After completing an educational content object, progress bar 510a can be updated automatically with an updated presentation reflecting the completed content object. In other cases, a user may have to manually select a button indicating that he or she has completed the educational content object.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 7A:
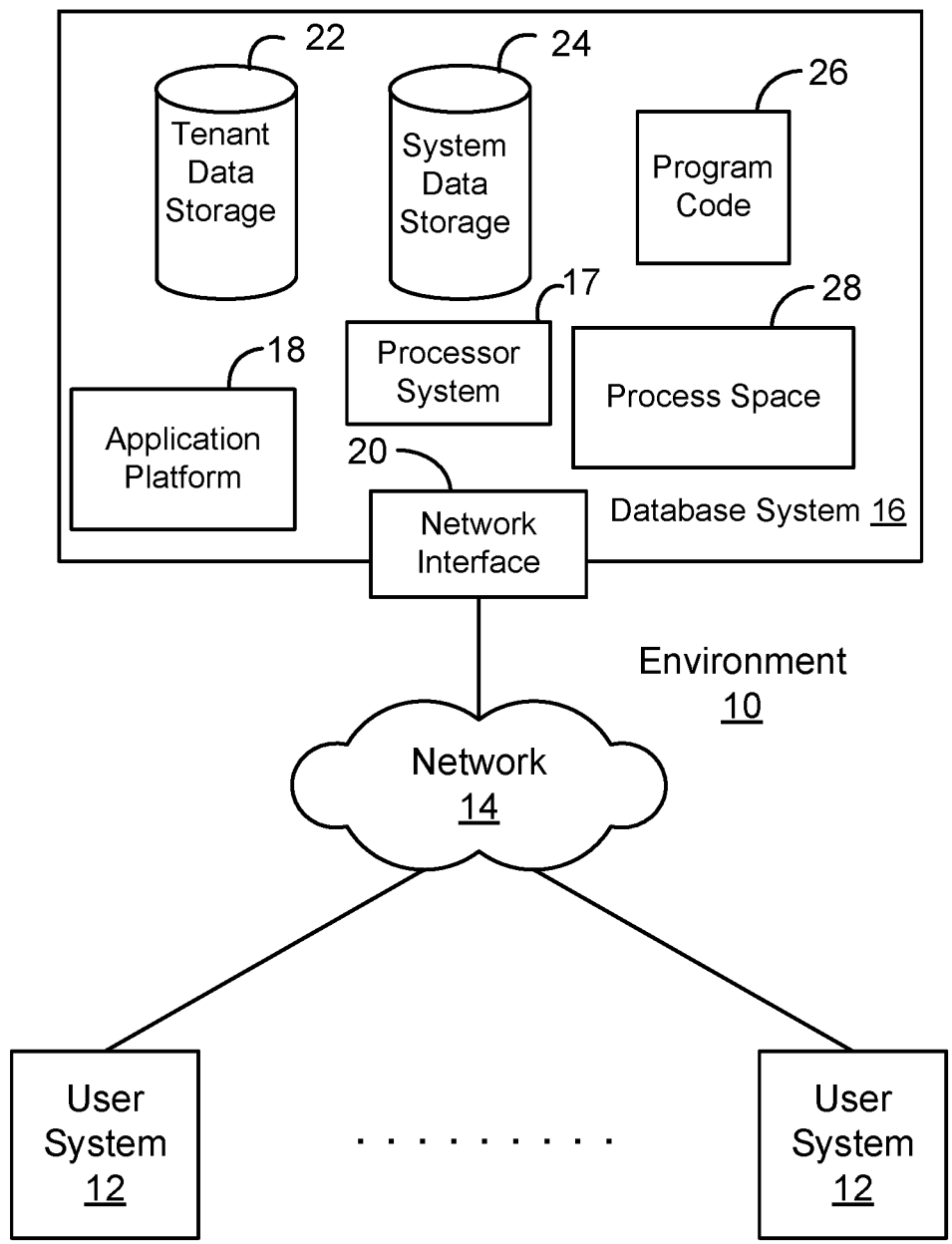
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
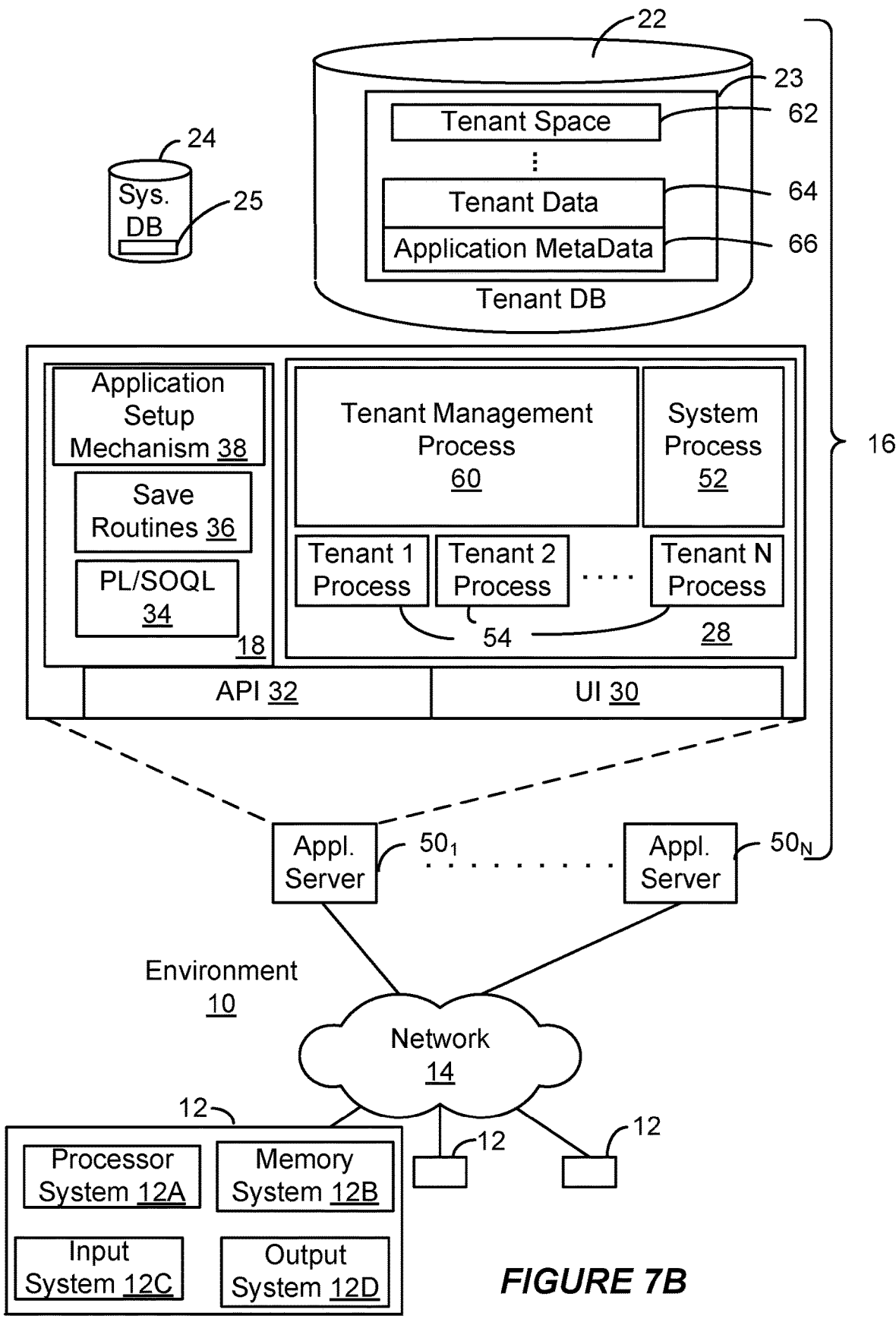
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
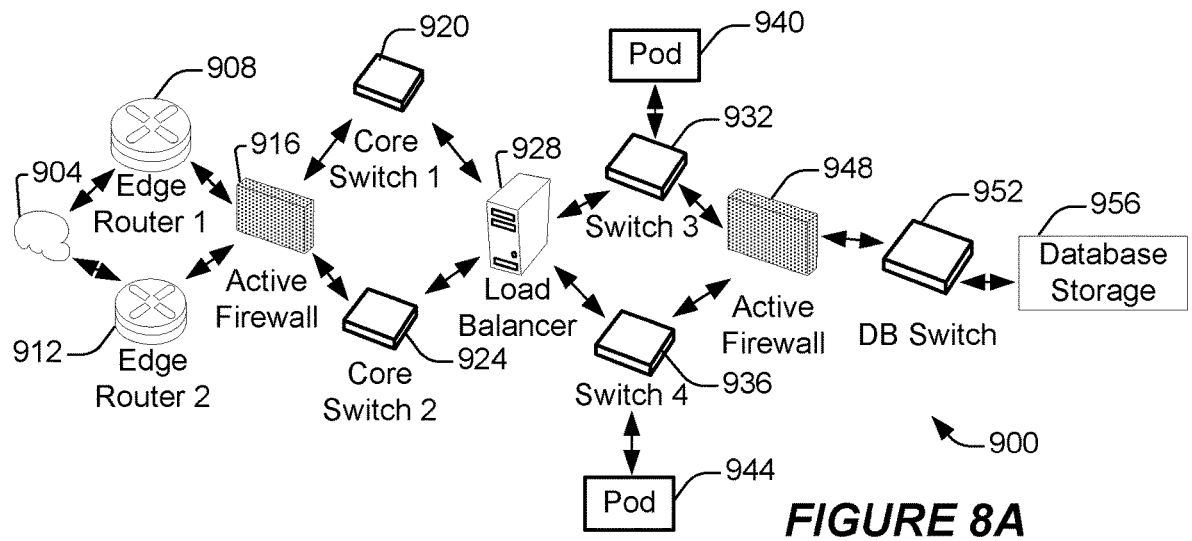
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
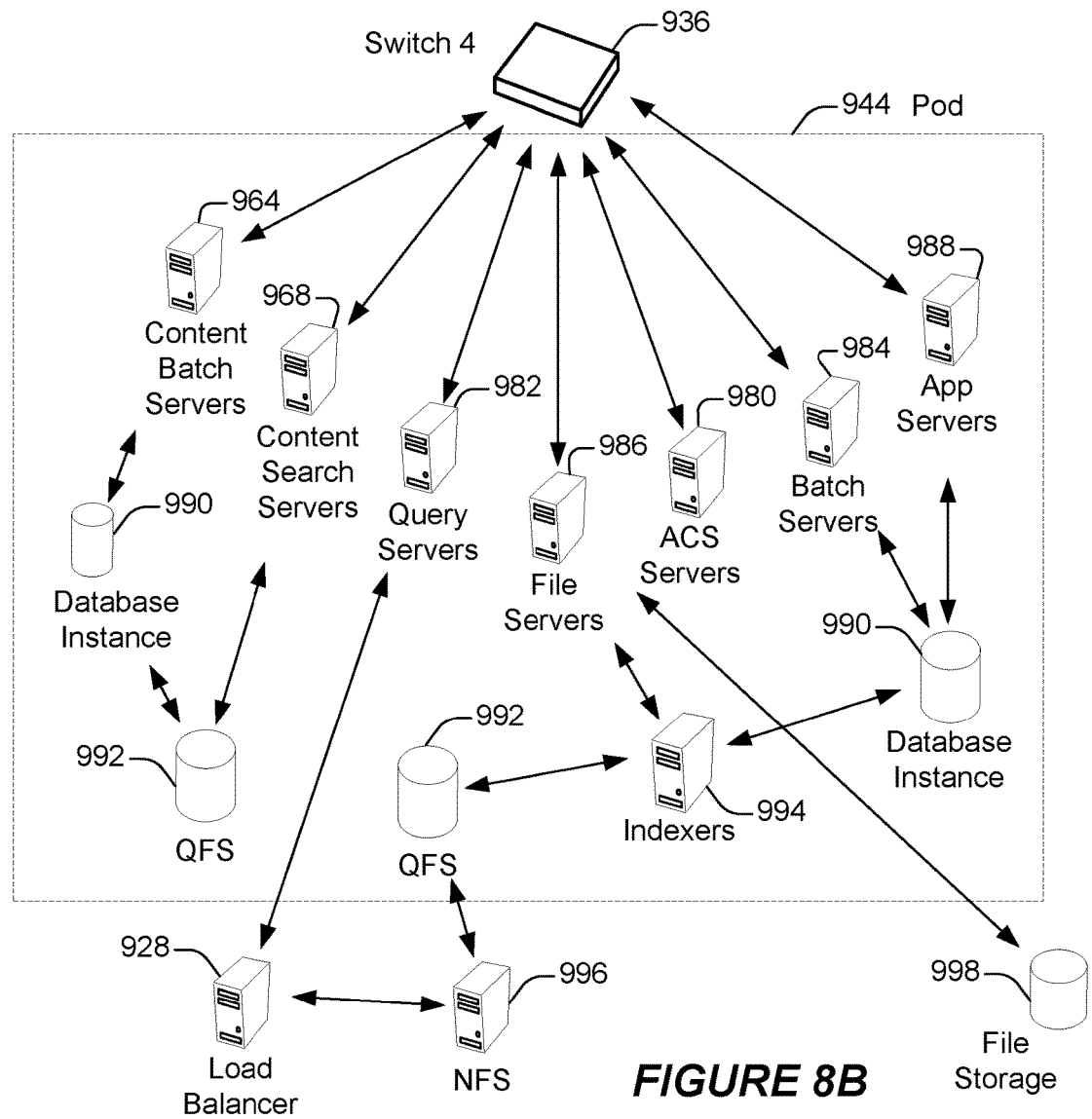
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
an enterprise learning system implemented using a server system, the enterprise learning system configurable to cause:
processing a content object sequence request received from a first user device of a first one of a plurality of users of the enterprise learning system, the content object sequence request pertaining to a content object sequence;
identifying a plurality of permissions maintained by one or more data objects stored in a database as being associated with the first user;
determining, using the one or more data objects stored in the database, that the permissions provide the first user rights to at least view and edit content object sequences;
after determining that the permissions provide the first user rights to at least view and edit content object sequences, identifying, by a recommendation engine, a first educational content object pertaining to the content object sequence;
determining, by the recommendation engine, that the first educational content object has been assigned by at least a third one of the plurality of users of the enterprise learning system to a set of users of the plurality of users of the enterprise learning system; and
providing, using the recommendation engine, a recommendation of the first educational content object for presentation via the first user device, the first educational content object representing a recommended content object pertaining to the content object sequence, the first educational content object being provided based, at least in part, on a result of determining that the first educational content object has been assigned by at least a third one of the plurality of users of the enterprise learning system to a set of users of the plurality of users of the enterprise learning system;

responsive to receiving, from the first user device, a request to add the first educational content object to the content object sequence, generating or updating the content object sequence to add the first educational content object to the content object sequence, the content object sequence having a sequential order of educational content objects; and sharing the generated or updated content object sequence with at least a second one of the users of the enterprise learning system, the shared content object sequence being displayable in a user interface of a second user device of the second user.

2. The system of claim 1, the enterprise learning system further configurable to cause:

processing a modification to the content object sequence, the modification changing or updating the sequential order of educational content objects in the content object sequence.

3. The system of claim 2, wherein processing the modification to the content object sequence comprises:

assigning a first position of the sequential order to the first educational content object; and assigning, based on the assigned first position, a second position of the sequential order to the second educational content object.

4. The system of claim 1, wherein the educational content objects comprise one or more of: a unit object, a module object, a path object, a badge object, a project object, a custom object, or an assessment.

5. The system of claim 1, wherein sharing the generated or updated content object sequence with the second user is performed responsive to:

identifying a permission associated with the second user; and determining that the permission associated with the second user provides the second user rights to at least view the content object sequence based on the identified permission.

6. The system of claim 1, wherein the generating or updating of the content object sequence is based on a first application programming interface (API) request of a public API, and wherein sharing the generated or updated content object sequence with the second user is based on a second API request of the public API different from the first API request, the public API being an extensible public programming interface configured to assign and/or track content object sequences based on organizational needs.

7. The system of claim 1, the enterprise learning system further configurable to cause:

providing a first preview presentation of the content object sequence to the first user interface of the first user device; and providing a second preview presentation to the second user interface of the second user device, the second preview presentation being inaccessible to one or more further user devices.

8. The system of claim 1, wherein sharing the generated or updated content object sequence with the second user comprises sharing the generated or updated content object sequence with a public user of a social networking system controlled by a first provider different from a second provider controlling the enterprise learning system.

9. The system of claim 1, wherein displaying the shared content object sequence in the second user interface of the second user device of the second user comprises displaying a progress bar representing an amount of progress towards completion of the shared content object sequence.

10. The system of claim 1, the set of users and the second user sharing a set of one or more user characteristics.

11. The system of claim 10, the set of user characteristics comprising one or more of: a job title or a department.

12. The system of claim 1, the enterprise learning system further configurable to cause:

determining that the first educational content object pertains to the content object sequence based, at least in part, on a title of the content object sequence.

13. The system of claim 1, the enterprise learning system further configurable to cause:

determining that the permissions provide the first user rights to at least view and edit the content object sequence.

14. The system of claim 1, the set of users including at least a fourth user of the enterprise learning system, the third user being a supervisor of the set of users.

15. A method comprising:

processing a content object sequence request received from a first user device of a first one of a plurality of users of an enterprise learning system, the content object sequence request pertaining to a content object sequence;

identifying a plurality of permissions maintained by one or more data objects stored in a database as being associated with the first user;

determining, using the one or more data objects stored in the database, that the permissions provide the first user rights to at least view and edit content object sequences;

after determining that the permissions provide the first user rights to at least view and edit content object sequences, identifying, by a recommendation engine, a first educational content object pertaining to the content object sequence;

determining, by the recommendation engine, that the first educational content object has been assigned by at least a third one of the plurality of users of the enterprise learning system to a set of users of the plurality of users of the enterprise learning system; and providing, using the recommendation engine, a recommendation of the first educational content object for presentation via the first user device, the first educational content object representing a recommended content object pertaining to the content object sequence, the first educational content object being provided based, at least in part, on a result of determining that the first educational content object has been assigned by at least a third one of the plurality of users of the enterprise learning system to a set of users of the plurality of users of the enterprise learning system;

responsive to receiving, from the first user device, a request to add the first educational content object to the content object sequence, generating or updating the content object sequence to add the first educational content object to the content object sequence, the content object sequence having a sequential order of educational content objects; and sharing the generated or updated content object sequence with at least a second one of the users of the enterprise learning system, the shared content object sequence being displayable in a user interface of a second user device of the second user.

16. The method of claim 15, the method further comprising:
processing a modification to a second one of the educational content objects, the modification changing or updating the sequential order of the educational content objects in the content object sequence.

17. The method of claim 16, wherein processing the modification to the content object sequence comprises:
assigning a first position of the sequential order to the first educational content object; and
assigning, based on the assigned first position, a second position of the sequential order to the second educational content object.

18. The method of claim 15, wherein the educational content objects comprise one or more of: a unit object, a module object, a path object, a badge object, a project object, a custom object, or an assessment.

19. The method of claim 15, wherein sharing the generated or updated content object sequence with the second user is performed responsive to:
identifying a permission associated with the second user; and
determining that the permission associated with the second user provides the second user rights to at least view the content object sequence based on the identified permission.

20. The method of claim 15, wherein the generating or updating of the content object sequence is based on a first application programming interface (API) request of a public API, and wherein sharing the generated or updated content object sequence with the second user is based on a second API request of the public API different from the first API request, the public API being an extensible public programming interface configured to assign and/or track content object sequences based on organizational needs.

21. The method of claim 15, the method further comprising:
providing a first preview presentation of the content object sequence to the first user interface of the first user device; and
providing a second preview presentation to the second user interface of the second user device, the second preview presentation being inaccessible to one or more further user devices.

22. The method of claim 15, wherein the permissions do not provide the first user rights to publish one or more content object sequences including the content object sequence.

23. The method of claim 15, further comprising:
processing a second content object sequence request received from the second user, the second content object sequence request indicating a request to publish the content object sequence;
determining, using the one or more data objects stored in the database, that the permissions provide the second user rights to publish the content object sequence; and
after determining that the permissions provide the second user rights to publish the content object sequence, publishing the content object sequence.

24. A computer program product comprising one or more non-transitory computer-readable media having computer program instructions stored therein, the computer program instructions being configured such that, when executed by one or more computing devices, the computer program instructions cause:
processing a content object sequence request received from a first user device of a first one of a plurality of users of an enterprise learning system, the content object sequence request pertaining to a content object sequence;
identifying a plurality of permissions maintained by one or more data objects stored in a database as being associated with the first user;
determining, using the one or more data objects stored in the database, that the permissions provide the first user rights to at least view and edit content object sequences;
after determining that the permissions provide the first user rights to at least view and edit content object sequences, identifying, by a recommendation engine, a first educational content object pertaining to the content object sequence;
determining, by the recommendation engine, that the first educational content object has been assigned by at least a third one of the plurality of users of the enterprise learning system to a set of users of the plurality of users of the enterprise learning system; and
providing, using the recommendation engine, a recommendation of the first educational content object for presentation via the first user device, the first educational content object representing a recommended content object pertaining to the content object sequence, the first educational content object being provided based, at least in part, on a result of determining that the first educational content object has been assigned by at least a third one of the plurality of users of the enterprise learning system to a set of users of the plurality of users of the enterprise learning system;
responsive to receiving, from the first user device, a request to add the first educational content object to the content object sequence, generating or updating the content object sequence to add the first educational content object to the content object sequence, the content object sequence having a sequential order of educational content objects; and
sharing the generated or updated content object sequence with at least a second one of the users of the enterprise learning system, the shared content object sequence being displayable in a user interface of a second user device of the second user.

25. The computer program product of claim 24, the instructions further configurable to cause:
changing or updating a sequential order of educational content objects of the content object sequence.

* * * * *